United States Patent
Park et al.

(10) Patent No.: US 10,300,763 B2
(45) Date of Patent: May 28, 2019

(54) SYSTEM AND METHOD FOR CONTROLLING AIR CONDITIONER FOR VEHICLES

(71) Applicant: Hyundai Motor Company, Seoul (KR)

(72) Inventors: Jae Hyun Park, Gunpo-si (KR); Sang Hun Kim, Anyang-si (KR); Chang Won Lee, Suwon-si (KR); Joon Hyung Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 580 days.

(21) Appl. No.: 14/934,077

(22) Filed: Nov. 5, 2015

(65) Prior Publication Data

US 2016/0311292 A1  Oct. 27, 2016

(30) Foreign Application Priority Data

Apr. 27, 2015 (KR) .......................... 10-2015-0058819

(51) Int. Cl.
*B60H 1/00* (2006.01)

(52) U.S. Cl.
CPC ....... *B60H 1/00742* (2013.01); *B60H 1/0075* (2013.01); *B60H 1/00842* (2013.01); *B60H 1/00885* (2013.01); *B60H 2001/002* (2013.01)

(58) Field of Classification Search
CPC .......................... B60H 1/00742; B60H 1/0075
See application file for complete search history.

(56) References Cited

U.S. PATENT DOCUMENTS

| 9,517,679 B2 * | 12/2016 | Frank ................ B60R 21/01532 |
| 2007/0122173 A1 * | 5/2007 | Mitsuoka ........... G03G 15/2039 |
| | | 399/69 |

FOREIGN PATENT DOCUMENTS

| JP | 2004-256101 A | 9/2004 |
| JP | 2005-257688 A | 9/2005 |
| JP | 2006-137364 A | 6/2006 |
| KR | 10-2006-0093184 A | 8/2006 |
| KR | 10-2010-0125596 A | 12/2010 |
| KR | 10-2011-0134611 A | 12/2011 |
| KR | 10-2013-0053704 A | 5/2013 |

* cited by examiner

*Primary Examiner* — Keith Raymond
*Assistant Examiner* — Nael Babaa
(74) *Attorney, Agent, or Firm* — Morgan, Lewis & Bockius LLP

(57) ABSTRACT

A system for controlling an air conditioner for vehicles may include a sensor configured to sense surface temperature of a passenger sitting part of a rear seat of a vehicle, a reference temperature estimation device configured to estimate surface temperature of the passenger non-sitting part of the rear seat as a reference temperature, a passenger boarding recognition device configured to compare the surface temperature of the passenger sitting part sensed by the sensor, with the reference temperature estimated by the reference temperature estimation device and to judge that a passenger is seated on the rear seat when a difference between the surface temperature of the passenger sitting part and the reference temperature exceeds a critical value, and an air conditioner operation controller configured to differently control volume and temperature of air discharged from the air conditioner according to whether or not a passenger is seated on the rear seat.

7 Claims, 5 Drawing Sheets

SYSTEM AND METHOD FOR CONTROLLING AIR CONDITIONER FOR VEHICLES

CROSS-REFERENCE TO RELATED APPLICATION

The present application claims priority to Korean Patent Application No. 10-2015-0058819 filed Apr. 27, 2015, the entire contents of which is incorporated herein for all purposes by this reference.

BACKGROUND OF THE INVENTION

Field of the Invention

The present invention relates to a system and method for controlling an air conditioner for vehicles. More particularly, it relates to a system and method for controlling an air conditioner for vehicles which may optimally control an air volume and an indoor temperature caused by the air conditioner according to whether or not a passenger is seated on a rear seat of a vehicle.

Description of Related Art

An air conditioner of a vehicle is an essential convenience system for vehicles which adjusts an indoor temperature of a vehicle to a desired level according to outdoor conditions in summer and winter and removes moisture or frost from a front glass window of the vehicle.

Proper volume of discharged air and indoor temperature by the air conditioner may influence a second or third row seat as well as a first row seat and thus provide indoor comfort to passengers on the second or third row seat as well as passengers on the first row seat.

However, if there is no passenger on the second and third row seats of the vehicle, the volume of air is unnecessarily discharged toward the second and third row seats and unnecessary energy is consumed.

Conventionally, in consideration of such a problem, a technique, in which infrared (IR) sensors sense that there is no passenger on the second and third seats of the vehicle and the volume of air discharged through second row discharge holes is reduced or removed, may be employed, thus being capable of reducing the volume of air unnecessarily discharged through the second row discharge holes, decreasing the driving time and driving amount of the air conditioner and thus saving energy.

However, since a total of 6 or more IR sensors are used to sense whether or not passengers are seated on the rear seats (second and third row seats), cost increase may be caused.

That is, in case of the convectional technique, the IR sensors are used not only to measure the temperature of a passenger on a passenger sitting part to detect whether or not a passenger is seated on the passenger sitting part but also to separately measure a reference temperature of a reference point of a passenger unboarded region (for example, a central region of the rear seat) and whether or not a passenger is seated on the passenger sitting part is judged using a temperature difference between the passenger sitting part and the passenger unboarded region. Additional use of such a separate IR sensor to measure the reference temperature in addition to the IR sensors to measure the temperatures of passengers may cause cost increase and weight increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and method for controlling an air conditioner for vehicles in which the temperature of a passenger sitting part of a rear seat of a vehicle (for example, the temperature of a passenger)may be sensed using an infrared (IR) sensor and, simultaneously, the reference temperature of a passenger non-sitting part of the rear seat (for example, the central region of the rear seat) may be precisely estimated using temperature change due to heat transfer through convection of indoor air and temperature change due to a quantity of solar radiation, and whether or not a passenger boards the rear seat may be precisely judged by comparing the sensed temperature of the passenger sitting part and the estimated reference temperature of the passenger non-sitting part.

According to various aspects of the present invention, a system for controlling an air conditioner for vehicles may include a sensor configured to sense surface temperature of a passenger sitting part of a rear seat of a vehicle, a reference temperature estimation device configured to estimate surface temperature of the passenger non-sitting part of the rear seat as a reference temperature using temperature change due to heat transfer through convection of indoor air and temperature change due to a quantity of solar radiation, a passenger boarding recognition device configured to compare the surface temperature of the passenger sitting part sensed by the sensor, with the reference temperature estimated by the reference temperature estimation device and to judge that a passenger is seated on the rear seat when a difference between the surface temperature of the passenger sitting part and the reference temperature exceeds a critical value, and an air conditioner operation controller configured to differently control volume and temperature of air discharged from the air conditioner according to a result of judgment as to whether or not a passenger is seated on the rear seat by the passenger boarding recognition device.

The system may further include a reference temperature error removal device configured to receive feedback of the temperature of the passenger sitting part, sensed by the sensor, and to correct an error between the reference temperature, estimated by the reference temperature estimation device, and an actual measurement temperature.

The sensor configured to sense the surface temperature of the passenger sitting part may be an IR sensor.

According to various aspects of the present invention, a method for controlling an air conditioner for vehicles may include sensing, by a sensor, surface temperature of a passenger sitting part of a rear seat of a vehicle, estimating, by a reference temperature estimation device, surface temperature of the passenger non-sitting part of the rear seat as a reference temperature using temperature change due to heat transfer through convection of indoor air and temperature change due to a quantity of solar radiation, comparing, by a passenger boarding recognition device, the surface temperature of the passenger sitting part with the estimated reference temperature and judging that a passenger is seated on the rear seat when a difference between the surface temperature of the passenger sitting part and the reference temperature exceeds a critical value, and differently controlling volume and temperature of air discharged from the air conditioner, by an air conditioner operation controller, according to a result of judgment as to whether or not a passenger is seated on the rear seat.

The method may further include receiving feedback of the sensed surface temperature of the passenger sitting part and correcting an error, by a reference temperature error removal device, between the estimated reference temperature and an actual measurement temperature.

In the estimation of the reference temperature, the reference temperature may be estimated by an equation of:

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat},$$

where Ts represents an estimated reference temperature of the passenger non-sitting part, UAseat represents a heat transfer coefficient or tuning coefficient of the seat, dt represents a measurement interval, qs represents a measured quantity of solar radiation, MCseat represents a heat capacity of the seat, Tr represents a measured indoor temperature by an in-car sensor, Aseat represents an area of the passenger non-sitting part, and n represents the number of operations.

In the correction of the error, the reference temperature may be determined by an equation of:

$$T_s(n) = \left(1 - \frac{UA_{seat}}{MC_{seat}}dt\right)T_s(n-1) + \frac{UA_{seat}}{MC_{seat}}dtT_r +$$
$$\dot{q}_s'' A_{seat} \boxed{+ \frac{H}{MC_{seat}}dt(T_{ir}(n-1) - T_s(n-1))},$$

where a part emphasized by a dotted line represents a feedback part to remove the error of the reference temperature of the passenger non-sitting part, Ts represents an estimated reference temperature of the passenger non-sitting part, UAseat represents a heat transfer coefficient or tuning coefficient of the seat, dt represents a measurement interval, qs represents a measured quantity of solar radiation, MCseat represents a heat capacity of the seat, Tr represents a measured indoor temperature (by the in-car sensor), Aseat represents an area of the passenger non-sitting part, n represents the number of operations, and Tir represents a temperature of the passenger sitting part sensed by an IR sensor.

In the differently controlling of the volume and temperature of air discharged from the air conditioner, the volume of air discharged from the air conditioner may be reduced when no passenger is seated on the rear seat, as compared to a case where a passenger is seated on the rear seat.

In the differently controlling of the volume and temperature of air discharged from the air conditioner, the temperature of air discharged from the air conditioner according to change of the volume of air discharged from the air conditioner may be controlled by an equation of:

$$T_{do} = \frac{\dot{Q}_{A/C}}{\dot{m}C_p} + T_{intake},$$

where Tdo represents a temperature of the discharged air, QA/C represents an air conditioning load, m represents a flow rate, Cp represents specific heat of air, and Tintake represents a temperature of intake air.

In the comparison and judgment, when it is judged that a passenger is seated on the rear seat, when the velocity of the vehicle is 0 km, it is judged that a passenger boards the vehicle presently from the outside of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
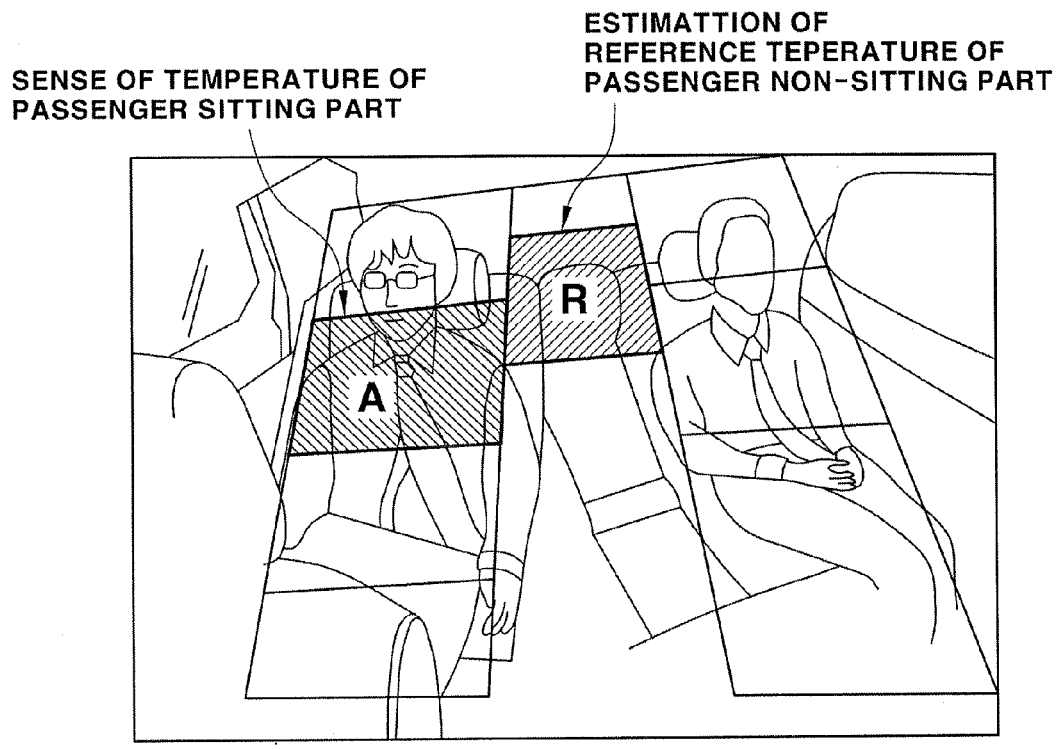
FIG. 3 is a schematic view illustrating positions for sensing the temperature of a passenger sitting part and estimating the temperature of a passenger non-sitting part in the exemplary method for controlling the air conditioner for vehicles in accordance with the present invention.

With reference to FIG. 3, in order to judge whether or not a passenger is seated on a rear seat, such as a second row seat or a third row seat, of a vehicle, the temperatures of a passenger sitting part (one of both sitting parts of the rear seat: a part indicated by "A" of FIG. 3) and a passenger non-sitting part (a part between both sitting parts of the rear seat: a part indicated by "B" of FIG. 3) need to be detected.

For this purpose, in the present invention, the surface temperature of the passenger sitting part of the rear seat is sensed by an infrared (IR) sensor, and the surface temperature of the passenger non-sitting part (a reference temperature) is estimated using temperature change due to heat transfer through convection of indoor air and temperature change due to a quantity of solar radiation without a separate hardware element, such as an IR sensor or a temperature sensing device.

Figure 1:
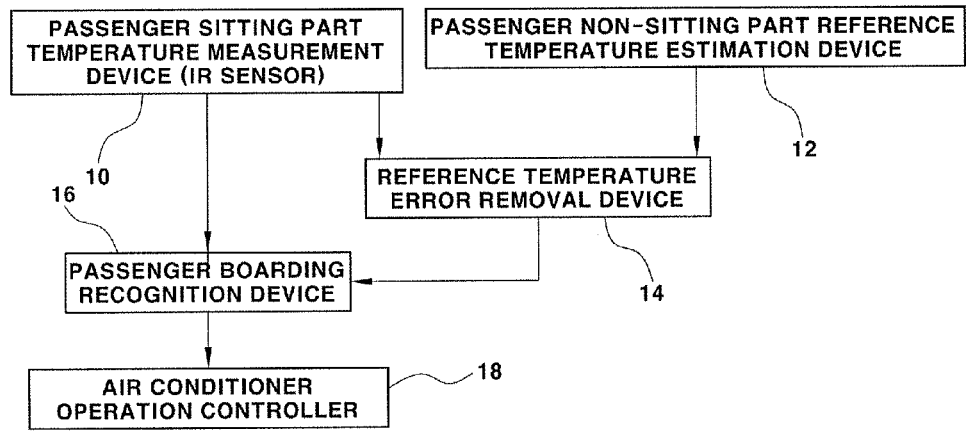
FIG. 1 is a block diagram illustrating configuration of an exemplary system for controlling an air conditioner for vehicles in accordance with the present invention.
Figure 2:
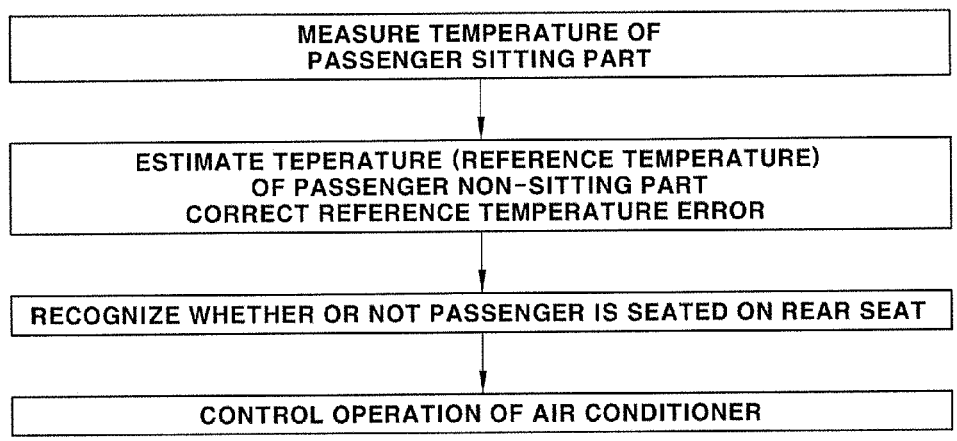
FIG. 2 is a flowchart illustrating an exemplary method for controlling an air conditioner for vehicles in accordance with the present invention.

FIG. 1 is a block diagram illustrating configuration of a system for controlling an air conditioner for vehicles in accordance with the present invention and FIG. 2 is a flowchart illustrating a method for controlling an air conditioner for vehicles in accordance with the present invention.

First, a passenger sitting part temperature measurement device 10 senses the surface temperature of the passenger sitting part of the rear seat. Here, an IR sensor is used as the passenger sitting part temperature measurement device 10.

Simultaneously, a reference temperature estimation device 12 estimates the surface temperature of the passenger non-sitting part of the rear seat as a reference temperature. Here, the surface temperature of the passenger non-sitting part is estimated using temperature change due to heat transfer through convection of indoor air and temperature change due to a quantity of solar radiation.

In order to estimate the surface temperature of the passenger non-sitting part, i.e., the reference temperature, a state equation, such as Equation 1 below, may be expressed using a heat transfer coefficient UA of a region including the passenger non-sitting part and an area A of the passenger non-sitting part, and Equation 2 below may be acquired by applying a reference temperature Ts to the state equation.

$$MC_{seat}\frac{dT_{IR}}{dt} = \dot{q}_s'' A_{seat} + U_{seat} A_{seat}(T_r - T_{IR}) \quad \text{[Equation 1]}$$

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat} \quad \text{[Equation 2]}$$

In Equations 1 and 2, Ts represents an estimated reference temperature of the passenger non-sitting part, UAseat represents a heat transfer coefficient (tuning coefficient) of the seat, dt represents a measurement interval, qs represents a measured quantity of solar radiation, MCseat represents a heat capacity of the seat, Tr represents a measured indoor temperature (by an in-car sensor), Aseat represents an area of the passenger non-sitting part, and n represents the number of operations.

Here, the heat transfer coefficient UAseat of the seat is a coefficient acquired in consideration of temperature change due to heat transfer through convection of indoor air, and the measured quantity of solar radiation qs is a value acquired in consideration of temperature change due to a quantity of solar radiation.

Therefore, the reference temperature estimation device 12 calculates the temperature of the passenger non-sitting part of the rear seat, i.e., the reference temperature, from Equation 2.

The reference temperature of the passenger non-sitting part calculated from Equation 2 may differ from an actual temperature (an actual measurement value).

Therefore, the system for controlling the air conditioner in accordance with the present invention may further include a reference temperature error removal device 14 which receives feedback of the temperature of the passenger sitting part, sensed by the passenger sitting part temperature sensing device 10, i.e., the IR sensor, in real time from the reference temperature estimation device 12 and corrects an error between the reference temperature estimated by the reference temperature estimation device 12 and the actual measurement temperature (the temperature of the passenger sitting part sensed by the IR sensor).

Therefore, the reference temperature error removal device 14 calculates a reference temperature in which the error is corrected using Equations 3 and 4 below by a logic including a feedback loop in addition to Equations 1 and 2.

$$MC_{seat}\frac{d\hat{T}_{IR}}{dt} = \dot{q}_s'' A_{seat} + U_{seat} A_{seat}(T_r - \hat{T}_{IR}) \boxed{+ H(T_{IR} - \hat{T}_{IR})} \quad \text{[Equation 3]}$$

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat} \boxed{+ \frac{H}{MC_{seat}}dt(T_{ir}(n-1) - T_s(n-1))} \quad \text{[Equation 4]}$$

In Equations 3 and 4, parts emphasized by dotted lines represent feedback parts to remove the error of the reference temperature of the passenger non-sitting part, Ts represents an estimated reference temperature of the passenger non-sitting part, UAseat represents a heat transfer coefficient (tuning coefficient) of the seat, dt represents a measurement interval, qs represents a measured quantity of solar radiation, MC represents a heat capacity of the seat, Tr represents a measured indoor temperature (by the in-car sensor), Aseat represents an area of the passenger non-sitting part, n represents the number of operations, and Tir represents the temperature of the passenger sitting part sensed by the IR sensor.

For example, since the temperature of the passenger sitting part sensed by the IR sensor under the condition that no passenger is seated on the passenger sitting part becomes an actual measurement temperature of the surface temperature of the seat, such an actual measurement temperature may be compared with the estimated reference temperature Ts of the passenger non-sitting part and the reference temperature of the passenger non-sitting part may be corrected to the actual measurement temperature.

Further, since the temperature of the passenger sitting part sensed by the IR sensor under the condition that a passenger is seated on the passenger sitting part is the sensed temperature of the passenger and may thus differ from the actual measurement temperature (the surface temperature of the seat) under the condition that no passenger is seated on the passenger sitting part, the reference temperature of the passenger non-sitting part may be corrected to the earlier actual measurement temperature (the surface temperature of the seat).

Therefore, the reference temperature error removal device 14 finally calculates the temperature of the passenger non-sitting part of the rear seat, i.e., the reference temperature, using Equation 4.

Thereafter, a passenger boarding recognition device 16 compares the surface temperature Tir(n) of the passenger sitting part sensed by the IR sensor with the reference temperature Ts(n) estimated by the reference temperature estimation device 12 (for example, the reference temperature calculated by the reference temperature error removal device) using Equation 5 below, thus calculating a difference therebetween.

$$E(n) = Tir(n) - Ts(n) \quad \text{[Equation 5]}$$

In Equation 5 above, E(n) represents a difference between the surface temperature of the passenger sitting part and the reference temperature, Tir(n) represents the surface temperature of the passenger sitting part, and Ts(n) represents the reference temperature of the passenger non-sitting part.

The passenger boarding recognition device 16 judges that a passenger is seated on the passenger sitting part of the rear seat if the difference E(n) between the surface temperature Tir(n) of the passenger sitting part and the reference temperature Ts(n) exceeds a critical value Tlimit.

Figure 4:
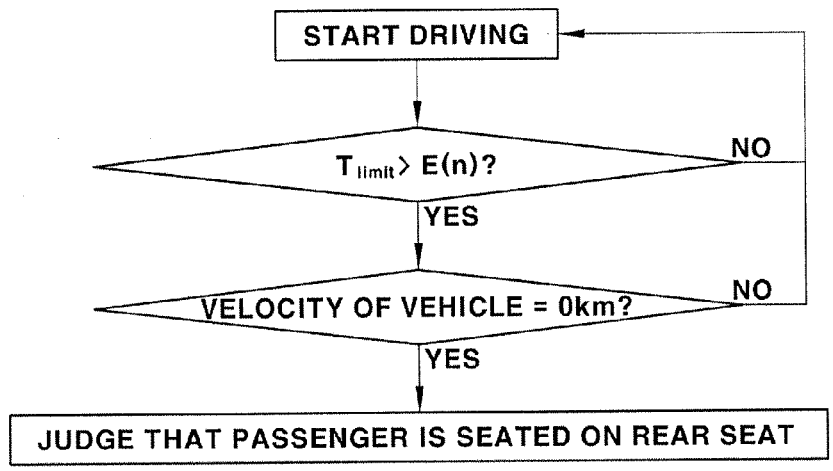
FIG. 4 is a flowchart illustrating recognizing whether or not a passenger boards a rear seat in the exemplary method for controlling the air conditioner for vehicles in accordance with the present invention.

Here, as exemplarily shown in FIG. 4, when the passenger boarding recognition device 16 judges whether or not a passenger is seated on the passenger sitting part of the rear seat, the passenger boarding recognition device 16 may check a velocity of the vehicle together with excess of the difference E(n) between the surface temperature Tir(n) of the passenger sitting part and the reference temperature Ts(n) over the critical value Tlimit, and recognize that a passenger boards the vehicle just now with opening a door, if the velocity of the vehicle is 0 km, thus more correctly judging that the passenger is seated on the passenger sitting part of the rear seat.

On the other hand, if the difference E(n) between the surface temperature Tir(n) of the passenger sitting part and the reference temperature Ts(n) does not exceed the critical value Tlimit, the passenger boarding recognition device 16 judges that no passenger is seated on the passenger sitting part of the rear seat.

Thereafter, an air conditioner operation controller 18 controls the volume and temperature of air discharged from the air conditioner according to a result of judgment as to whether or not a passenger is seated on the passenger sitting part by the passenger boarding recognition device 16.

Figure 5:
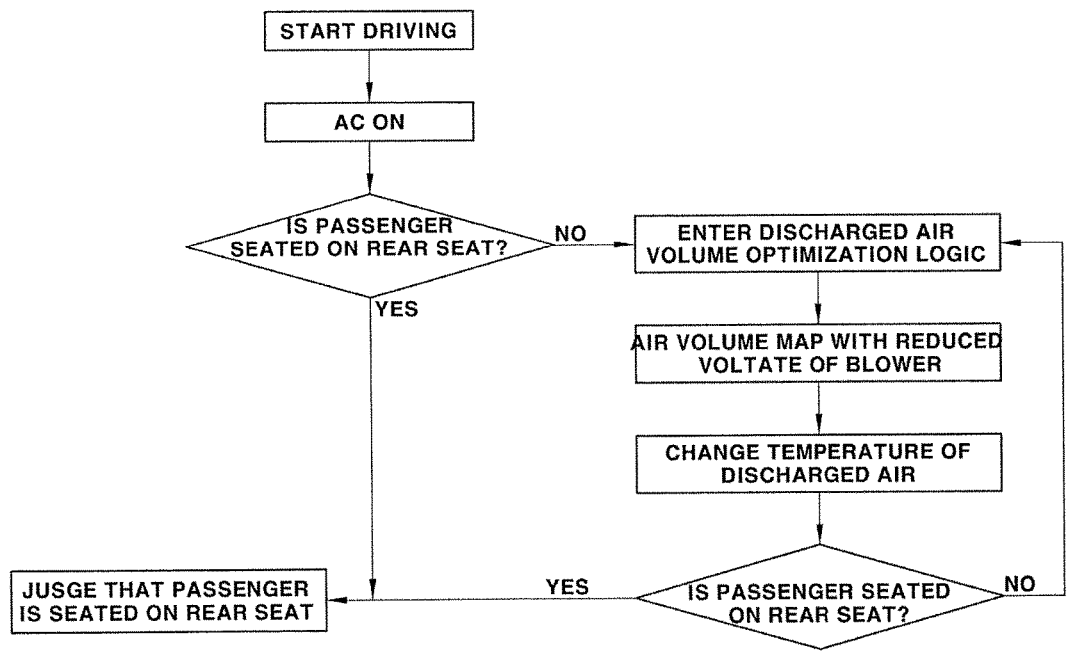
FIG. 5 is a flowchart illustrating controlling operation of the air conditioner in the exemplary method for controlling the air conditioner for vehicles in accordance with the present invention.
Figure 6:
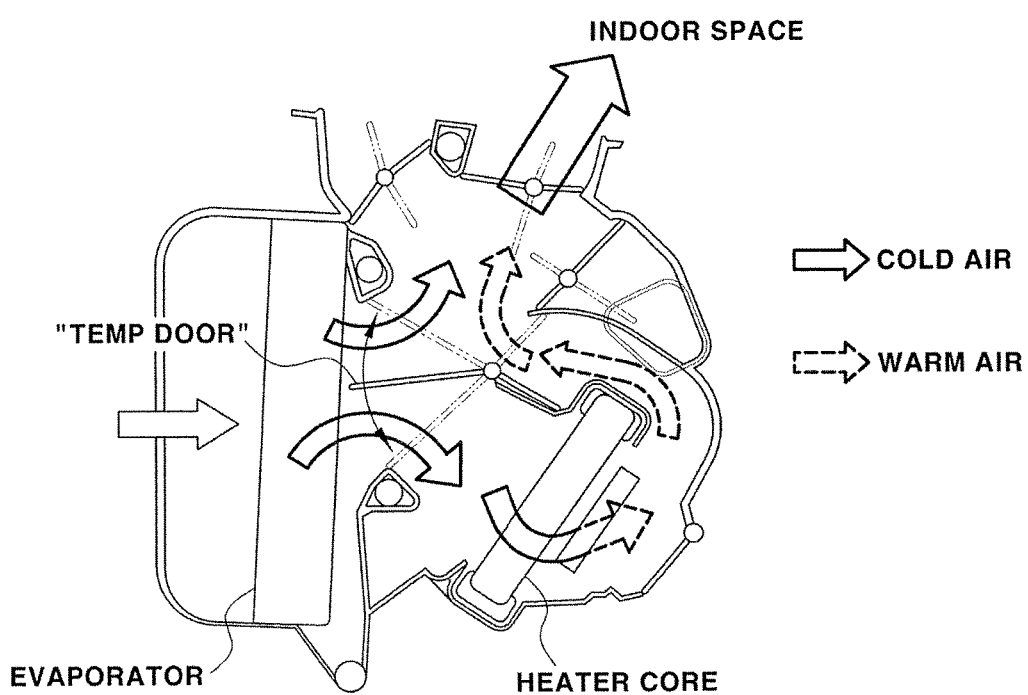
FIG. 6 is a schematic view illustrating an air conditioner to describe an example of control of operation of the air conditioner, in the exemplary method for controlling the air conditioner for vehicles in accordance with the present invention.

FIG. 5 is a flowchart illustrating controlling operation of the air conditioner in the method for controlling the air conditioner for vehicles in accordance with the present invention and FIG. 6 is a schematic view illustrating an air conditioner to describe an example of control of operation of the air conditioner.

With reference to FIG. 5, if the passenger boarding recognition device 16 judges that no passenger is seated on the passenger sitting part, the air conditioner enters a discharged air volume optimization logic of the air conditioner and the air conditioner operation controller 18 reduces the volume of air discharged from the air conditioner using an air volume map in which an air volume is reduced by reducing the operation voltage of a blower motor instead of a convectional air volume control map, if no passenger is seated on the passenger sitting part, as compared to a case where a passenger is seated on the passenger sitting part.

For example, as exemplarily shown in FIG. 6, a part of air having passed through an evaporator passes through a heater core by a temp door and is thus re-heated. In this case, the temperature and volume of discharged air are re-adjusted based on an energy equation.

Figure 7:
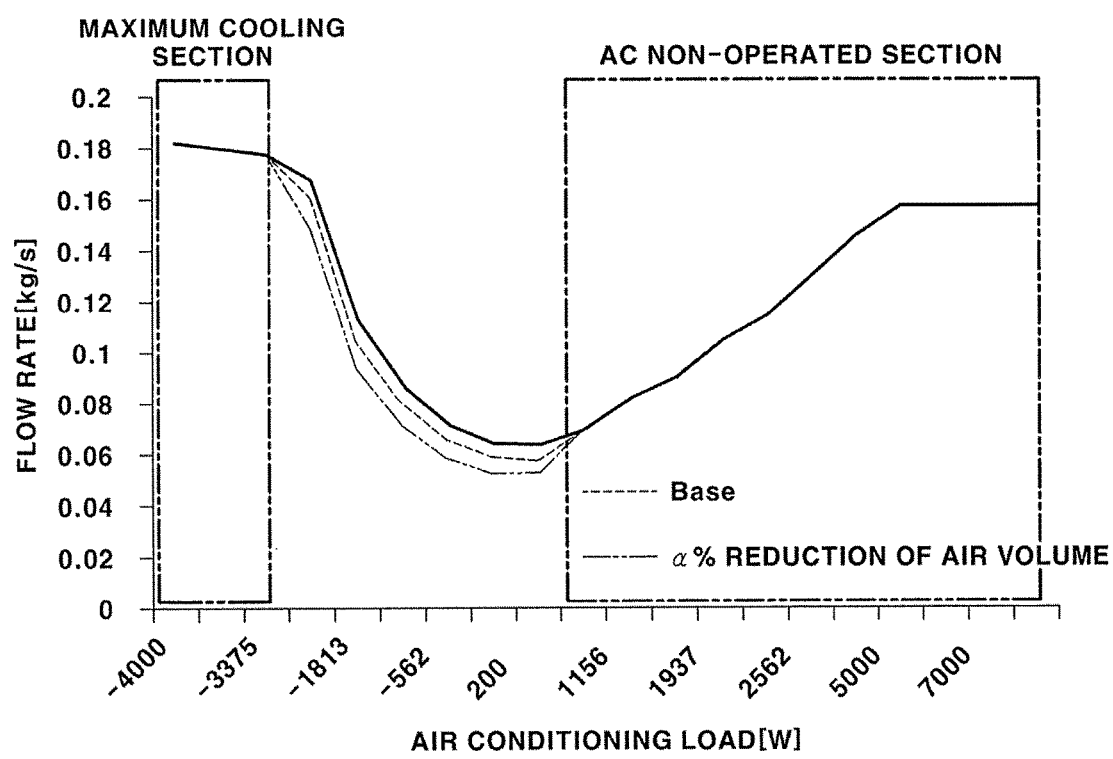
FIG. 7 is a graph illustrating improvement of fuel efficiency by controlling the air conditioner for vehicles in accordance with the present invention.

That is, when the air conditioner is automatically turned on (AC ON), if the temp door is located at a middle point, not a maximum cooling point, and thus, a part of air having passed through the evaporator passes through the heater core via the temp door and is thus re-heated, the volume of air discharged from the air conditioner is reduced, if no passenger is seated on the passenger sitting part, as compared to a case where a passenger is seated on the passenger sitting part, using the air volume map (with reference to FIG. 7) in which an air volume is reduced by reducing the operation voltage of the blower motor instead of the convectional air volume control map.

Here, in order to prevent change (for example, increase) of indoor temperature and change of comfort due to reduction of the volume of the discharged air, the temperature of discharged air is controlled using Equation 6 below.

$$T_{do} = \frac{\dot{Q}_{A/C}}{\dot{m}C_p} + T_{intake} \quad \text{[Equation 6]}$$

In Equation 6 above, Tdo represents a temperature of discharged air, QA/C represents an air conditioning load, m represents a flow rate, Cp represents specific heat of air, and Tintake represents a temperature of intake air.

Therefore, by reducing the flow rate of air to reduce the volume of discharged air, among factors of Equation 6 above, the temperature of the discharged air may be lowered under the condition that air conditioning load (a negative value) and intake air are maintained and, thereby, increase of indoor temperature and change of comfort may be prevented.

As described above, whether or not a passenger is seated on the passenger sitting part of the rear seat may be precisely judged by sensing the temperature of the passenger sitting part of the rear seat using an IR sensor and precisely estimating the reference temperature of the passenger non-sitting part of the rear seat using temperature change due to heat transfer through convection of indoor air and temperature change due to a quantity of solar radiation, and, if no passenger is seated on the passenger sitting part of the rear seat, the volume of air discharged from the air conditioner may be reduced to improve fuel efficiency.

As is apparent from the above description, the present invention provides the following effects.

First, the temperature of a passenger sitting part of a rear seat of a vehicle may be sensed using an IR sensor and, simultaneously, the reference temperature of a passenger non-sitting part of the rear seat may be precisely estimated using temperature change due to heat transfer through convection of indoor air and temperature change due to a quantity of solar radiation, and whether or not a passenger is seated on the passenger sitting part of the rear seat may be precisely judged by comparing the sensed temperature of the passenger sitting part and the estimated reference temperature of the passenger non-sitting part.

Second, differently from a convectional IR sensor to sense the reference temperature of a passenger non-sitting part, the reference temperature of the passenger non-sitting part of the rear seat may be estimated through an algorithm using temperature change due to heat transfer through convection of indoor air and temperature change due to a quantity of solar radiation and, thus, reduction of the number of parts of the vehicles and cost saving may be achieved due to reduction of the number of used IR sensors.

Third, if no passenger is seated on the passenger sitting part of the rear seat, the volume of air discharged from the air conditioner may be reduced and, thus, fuel efficiency may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an air conditioner for vehicles comprising:
   a sensor configured to sense surface temperature of a passenger sitting part of a rear seat of a vehicle;
   a reference temperature estimation processor configured to estimate surface temperature of a passenger non-sitting part of the rear seat as a reference temperature using temperature change due to heat transfer through convection of indoor air and temperature change due to a quantity of solar radiation;
   a passenger boarding recognition processor configured to compare the surface temperature of the passenger sitting part sensed by the sensor, with the reference temperature estimated by the reference temperature estimation processor and to judge that a passenger is seated on the rear seat when a difference between the surface temperature of the passenger sitting part and the reference temperature exceeds a critical value;
   an air conditioner operation controller configured to differently control volume and temperature of air discharged from the air conditioner according to a result of judgment as to whether or not a passenger is seated on the rear seat by the passenger boarding recognition processor; and
   a reference temperature error removal processor configured to receive feedback of the temperature of the passenger sitting part, sensed by the sensor, and to correct an error between the reference temperature, estimated by the reference temperature estimation device, and an actual measurement temperature,
   wherein the reference temperature is estimated by an equation of:

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat},$$

wherein $T_s$ represents an estimated reference temperature of the passenger non-sitting part, $UA_{seat}$ represents a heat transfer coefficient or turning coefficient of rear seat, $d_t$ represents a measurement interval, $q_s$ represents measured quantity of solar radiation, $MC_{seat}$ represents a heat capacity of the rear seat, $T_r$ represents a measured indoor temperature by an in-car sensor, $A_{seat}$ represents an area of the passenger non-sitting part, and n represents the number of operations.

2. The system of claim 1, wherein the sensor configured to sense the surface temperature of the passenger sitting part comprises an IR sensor.

3. A method for controlling an air conditioner for vehicles, comprising:
   sensing, by a sensor, surface temperature of a passenger sitting part of a rear seat of a vehicle;
   estimating, by a reference temperature estimation processor, surface temperature of a passenger non-sitting part of the rear seat as a reference temperature using temperature change due to heat transfer through convection of indoor air and temperature change due to a quantity of solar radiation;
   comparing, by a passenger boarding recognition processor, the surface temperature of the passenger sitting part with the estimated reference temperature and judging that a passenger is seated on the rear seat when a difference between the surface temperature of the passenger sitting part and the reference temperature exceeds a critical value; and
   differently controlling volume and temperature of air discharged from the air conditioner, by an air conditioner operation controller, according to a result of judgment as to whether or not a passenger is seated on the rear seat; and
   receiving feedback of the sensed surface temperature of the passenger sitting part and correcting an error, by a reference temperature error removal processor, between the estimated reference temperature and an actual measurement temperature,
   wherein the reference temperature is estimated by a first equation of:

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat},$$

wherein $T_s$ represents an estimated reference temperature of the passenger non-sitting part,
   $UA_{seat}$ represents a heat transfer coefficient or turning coefficient of rear seat, $d_t$ represents a measurement interval, $q_s$ represents measured quantity of solar radiation, $MC_{seat}$ represents a heat capacity of the rear seat, $T_r$ represents a measured indoor temperature by an in-car sensor, $A_{seat}$ represents an area of the passenger non-sitting part, and n represents the number of operations.

4. The method of claim 3, wherein, in the correction of the error, the reference temperature is determined by a second equation of:

$$T_s(n) = \left(1 - \frac{UA_{seat}}{MC_{seat}}dt\right)T_s(n-1) + \frac{UA_{seat}}{MC_{seat}}dtT_r + \dot{q}_s'' A_{seat} + \frac{H}{MC_{seat}}dt(T_{ir}(n-1) - T_s(n-1)),$$

wherein the $$+\frac{H}{MC_{seat}}dt(T_{ir}(n-1)-T_s(n-1))\Bigg],$$

in the second equation represents a feedback part to remove the error of the reference temperature of the passenger non-sitting part, $T_s$ represents an estimated reference temperature of the passenger non-sitting part, $UA_{seat}$ represents a heat transfer coefficient or tuning coefficient of the seat, $d_t$ represents a measurement interval, $q_s$ represents a measured quantity of solar radiation, $MC_{seat}$ represents a heat capacity of the seat, $T_r$ represents an indoor temperature measured by an in-car sensors, $A_{seat}$ represents an area of the passenger non-sitting part, n represents the number of operations, and $T_{ir}$ represents a temperature of the passenger sitting part sensed by an IR sensor wherein H is a gain.

5. The method of claim 3, wherein, in the differently controlling of the volume and temperature of air discharged from the air conditioner, the volume of air discharged from the air conditioner is reduced when no passenger is seated on the rear seat, as compared to a case where a passenger is seated on the rear seat.

6. The method of claim 5, wherein, in the differently controlling of the volume and temperature of air discharged from the air conditioner by the air conditioner operation controller, the temperature of air discharged from the air conditioner according to change of the volume of air discharged from the air conditioner is determined by a third equation of:

$$T_{do} = \frac{\dot{Q}_{A/C}}{\dot{m}C_p} + T_{intake}$$

wherein $T_{do}$ represents a temperature of the discharged air, $Q_{A/C}$ represents an air conditioning load, m represents a flow rate, $C_p$ represents specific heat of air, and $T_{intake}$ represents a temperature of intake air.

7. The method of claim 3, wherein, in the comparison and judgment, when it is judged that a passenger is seated on the rear seat, when a velocity of the vehicle is stopped, it is judged that a passenger enters the vehicle from the outside of the vehicle.

* * * * *